Figure 1:
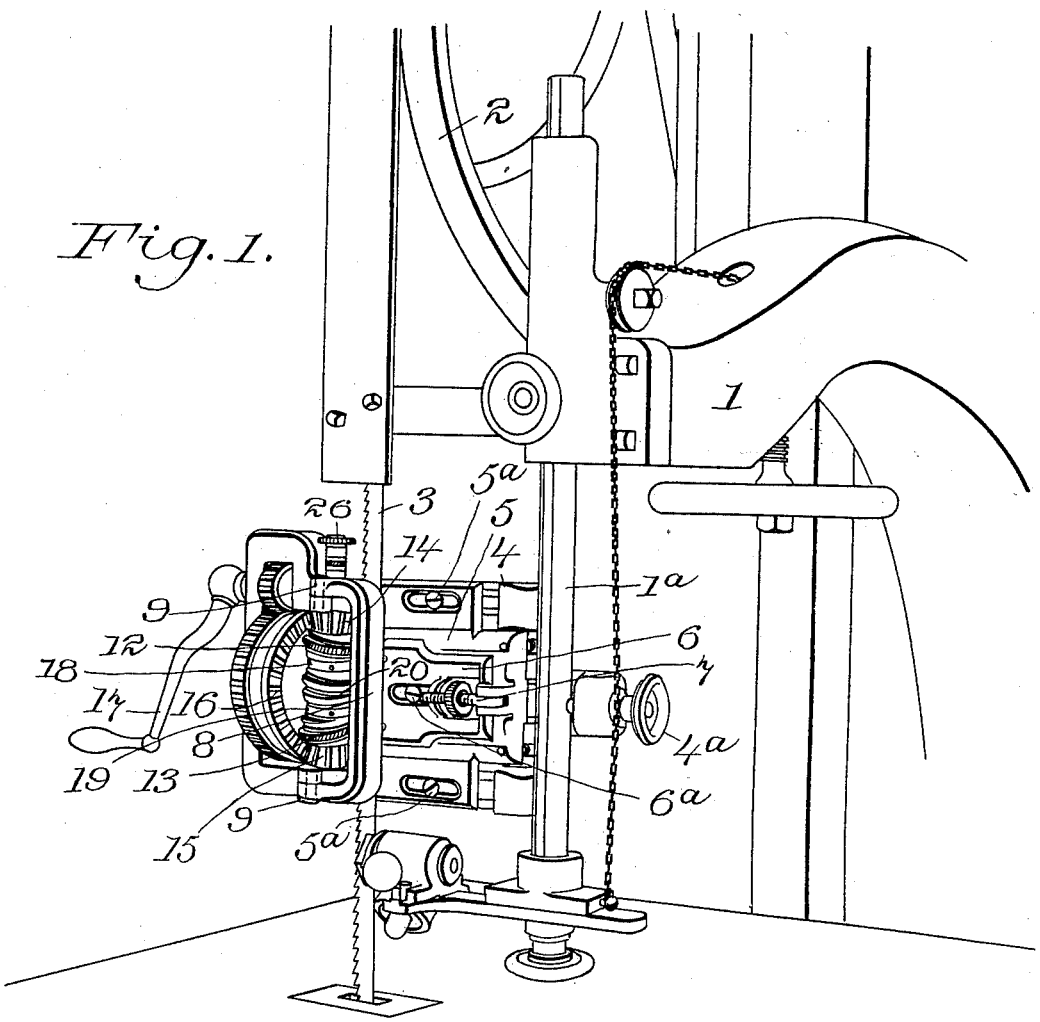

No. 612,774. Patented Oct. 18, 1898.
S. HICKS.
SAW FILING MACHINE.
(Application filed May 20, 1898.)

(No Model.) 2 Sheets—Sheet 1.

WITNESSES:

INVENTOR
Stephen Hicks
BY
ATTORNEY

No. 612,774. Patented Oct. 18, 1898.
S. HICKS.
SAW FILING MACHINE.
(Application filed May 20, 1898.)
(No Model.) 2 Sheets—Sheet 2.
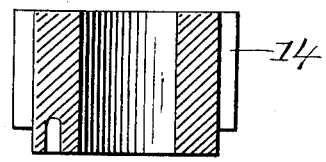
WITNESSES:
INVENTOR
Stephen Hicks
BY
his ATTORNEY

UNITED STATES PATENT OFFICE.

STEPHEN HICKS, OF NEW YORK, N. Y., ASSIGNOR TO STEPHEN HICKS & CO., OF SAME PLACE.

SAW-FILING MACHINE.

SPECIFICATION forming part of Letters Patent No. 612,774, dated October 18, 1898.

Application filed May 20, 1898. Serial No. 681,263. (No model.)

*To all whom it may concern:*

Be it known that I, STEPHEN HICKS, a citizen of the United States of America, and a resident of the city of New York, borough of Brooklyn, county of Kings, State of New York, have invented certain new and useful Improvements in Saw-Filing Machines, of which the following is a specification.

My invention relates to saw-filing machines, and more particularly consists of an improvement on the general type of machine illustrated and described in United States Letters Patent granted November 3, 1896, to Henry L. Morrell, No. 570,732.

In the use of such machines certain difficulties have been met of the following character: Irregularities are found to occur in the teeth of the saws to be filed resulting from imperfections in their manufacture or from previous filing by hand or otherwise. Moreover, no two saws of the same nominal pitch appear to have actually exactly the same pitch, and it becomes necessary to make an extremely-delicate adjustment of the files in a spiral-file machine to fit each particular saw. This required adjustment is too fine to be ordinarily obtained by the average mechanic. Even if obtained for one portion of the average saw-blade it may not hold good throughout the entire length of the blade. The result of these inequalities, from whatever source they arise, is that the files are compelled to take deeper cuts than their proper operation contemplates, and as this extra work is unevenly distributed between the two faces of the same file or between the two files the saw begins to creep in one direction or the other with reference to the files. As each of the files shown in Patent No. 570,732 extends through more than one complete turn of the spiral it never lets go of the saw-blade, and the inaccuracy of its work on one tooth is doubled on the next tooth it engages, trebled on the third, and so on until it begins to knock the teeth out of the saw instead of filing them. In other words, if the initial inaccuracy is such as to cause one of the files to cut one one-hundredth of an inch deeper into the under face of the tooth than it does into the upper face of the next tooth it will be lifted one one-hundredth of an inch with reference to the saw-blade, and consequently will cut two one-hundredths of an inch into the under face of the next tooth it engages, and so on in arithmetical progression. My invention avoids these difficulties by the simple plan of cutting off the files, so that neither one of them forms a complete turn of its spiral. It accordingly lets go of the first tooth before it begins on the next. Thus only the initial inaccuracy can at the most be repeated on each tooth. There is no aggravation of the evil by successively increasing errors. I diminish the initial error also by rendering the spiral files adjustable toward or from each other along the line of their common axis. I also provide a smooth-faced feed-worm, which may be used, if desired, to give a positive and even feed to the saw-blade.

The preferred form of my invention is shown as applied to a bandsaw-filing apparatus in the accompanying two sheets of drawings, in which—

Figure 2:
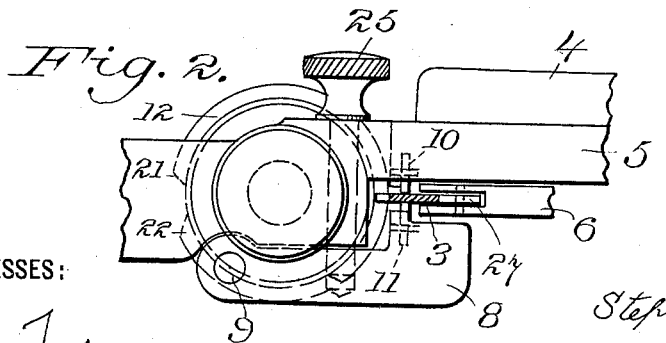

Figure 1 is a perspective view of a portion of a bandsaw-machine with my saw-filing apparatus operating on the saw. Fig. 2 is a detail view showing in plan the file-holder and bandsaw-guide, with a cross-section of the saw-blade. Fig. 3 is a detail view of my improved form of spiral files, their carriers, adjusting-nuts, and the smooth-faced feed-worms. Fig. 3ª represents a modification of the relative arrangement of the files. Fig. 4 is a similar view of the same parts in section, showing in addition the driving-gears for the files. Fig. 5 is a similar view to Fig. 4 with the parts assembled and a portion of the saw-blade being operated upon.

Throughout the drawings like reference-figures refer to like parts.

1 represents generally the frame of the bandsaw-machine.

2 is the upper bandsaw-wheel.

3 represents the bandsaw-blade.

4 is a casting attached to the upright 1ª of the bandsaw-frame by means of the set-screw 4ª. To the casting 4 the second casting 5 is attached by means of slots and set-screws 5ª 5ª. To this casting 5 a third casting 6 is attached by means of the slot and set-screw 6ª. This casting 6 is adjusted by means of the thumb-nut on the threaded bolt 7, which is hinged in a lug on the casting 5.

8 is a swinging section hinged to the casting 5 by the hinge 9.

The parts 5, 6, and 8, together with the rollers 10, 11, and 27, constitute a guide for the saw-blade and also a holder for the files 12 and 13. These spiral files 12 and 13 are driven by the pinions 14 and 15, which mesh with the crown-gear 16, and are put in motion by suitable gearing from the crank 17 or other mode of applying power.

The apparatus so far described coincides generally with the apparatus and mode of operation set out in Patent No. 570,732 before referred to.

To give the spiral files 12 and 13 a fine adjustment to and from each other along the lines of their common axis, I introduce the threaded nuts 18 and 19, mounted on a threaded cylinder intermediate of the files, as clearly shown in Figs. 3, 4, and 5. The small amount of adjustment necessary is rendered possible by the play of the pinions 14 and 15 within the carrying-frame 5 on their spindle 26.

The central threaded cylinder or nipple, on which the adjusting-nuts 18 and 19 are mounted, may, if desired, carry a smooth-faced feed-worm 20 of the same pitch as that of the spiral files 12 and 13. As provided for in Patent 570,732, one of these files, as 13, is formed on a right-hand helix, while the other, 12, is formed on a left-hand helix or spiral. As shown in the drawings, the worm-feed 20 is also a left-hand spiral and accordingly should be geared to rotate with the file 12.

The whole system of gearing, as clearly shown in Figs. 3 to 5, inclusive, consists of a pin 12ª on the carrier of the file 12, which enters a socket on the pinion 14, a pin 20ª on the feed-worm, which enters a socket in the carrier of the file 12, and a pin 13ª on the carrier of the file 13, which enters a socket in the pinion 15. As clearly shown in Fig. 3, the file 12 does not extend through a complete turn of its spiral, but is cut off, so as to leave an open space between its ends 21 and 22. In the same way the file 13 is cut off, so as to leave a space between its ends 23 and 24. These open spaces may be substantially opposite one another, as shown in Fig. 3, or they may be arranged so that the open portions of the two spirals are not in a line parallel with their common axis. This is illustrated by Fig. 3ª, which represents in dotted lines a substitute for file 13, in which the ends 23 and 24 of the file come at the left hand of the figure.

25 represents a thumb-screw for holding the swinging section 8 of the combined file-carrier and saw-guide in operative position.

The mode of operation of my invention is as follows: The apparatus being adjusted on the bandsaw-frame by means of the thumb-screw 4ª and the swinging section 8 being swung out, the saw-blade is put in position and the swinging section 8 closed, leaving the parts in the position shown in Fig. 2. Adjustment of the casting 6 and its guide-rollers 27 being secured by means of the thumb-nut on the threaded bolt 7 and adjustment of the roller side guides being secured by the thumb-screw 25, the files 12 and 13 are then adjusted to register as exactly as possible with the spaces between the saw-teeth by means of the nuts 18 and 19. Motion is then given to the files by turning the crank 17.

The peculiar advantage of my improvement consists in the fact that if there is any unequal action of one of the files, as 13, on the two faces of the angular depression 11 between the two saw-teeth with which it is engaged said file will let go of said teeth before its other end engages the depression 9 between the next two teeth and the saw-blade will spring back into its original position with reference to the worm-feed 20, and this error will not be carried over to and magnified in the action of the saw upon said second set of teeth. Moreover, the worm centers the blade between the two files and divides the unequal action, if any, between the two.

In case the worm-feed 20 is to be dispensed with the files 12 and 13 should have the relative arrangement shown in Figs. 3 and 3ª, so that the open portions of the two spirals are not in a line parallel to the common axis, in which case the saw-blade will always be under the control of one or the other of the files and each in turn operates as a driving-worm for the other.

It will be noticed in Fig. 5 that one of the files, as 13, will operate on the teeth having the odd numbers along the saw-blade, while the other file 12 will operate on those having the even numbers.

Various changes could be made in the details of the apparatus illustrated without departing from the spirit and scope of my invention so long as the open files are employed and the relative arrangement of the parts shown in the drawings and the mode of operation described in the specification are preserved.

Having, therefore, described my invention, what I claim as new, and desire to protect by Letters Patent, is—

1. In a saw-filing machine the combination of the guideways for the saw-blade, two spiral files which engage the teeth of the saw, each of said files extending through less than a complete revolution of its particular spiral, and means for supporting and simultaneously rotating said files about a common axis, substantially as described.

2. In a saw-filing machine the combination of the guideways for the saw-blade, two spiral files which engage the teeth of the saw, one of said files being a right-hand spiral, while the other is a left-hand spiral, but of equal pitch with the first, each of said files extending through less than a complete revolution of its particular spiral, and means for supporting and simultaneously rotating said files in opposite directions about a common axis, substantially as described.

3. In a saw-filing machine the combination of the guideways for the saw-blade, two spiral files which engage the teeth of the saw, each of said files extending through less than a complete revolution of its particular spiral, but so disposed that the open portions of the two spirals are not in a line parallel to their common axis, and means for supporting and simultaneously rotating said files about a common axis, substantially as described.

4. In a saw-filing machine the combination of the guideways for the saw-blade, two spiral files which engage the teeth of the saw, each of said files extending through less than a complete revolution of its particular spiral and means for supporting and simultaneously rotating said files about a common axis, together with a smooth-faced feed-worm of equal pitch with the files, geared to rotate at the same speed therewith, and also meshing with the teeth of the saw, substantially as described.

5. In a saw-filing machine the combination of the guideways for the saw-blade, two spiral files which engage the teeth of the saw, each of said files extending through less than a complete revolution of its particular spiral and means for supporting and simultaneously rotating said files about a common axis, together with means for adjusting said files to or from each other along the line of their common axis, substantially as described.

Signed by me, at New York city, this 14th day of May, 1898.

STEPHEN HICKS.

Witnesses:
A. PARKER SMITH,
LILIAN FOSTER.